J. P. MENTZER.
LOCKING MEANS FOR CHAINS.
APPLICATION FILED JAN. 16, 1919.
1,323,780.
Patented Dec. 2, 1919.
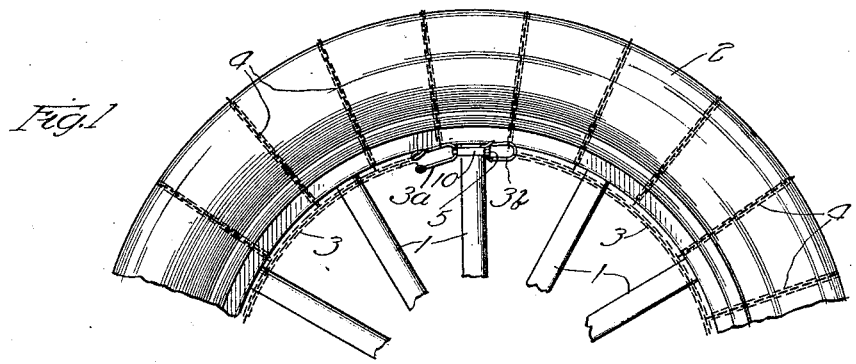
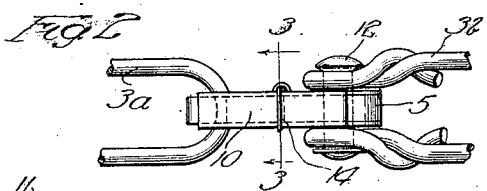
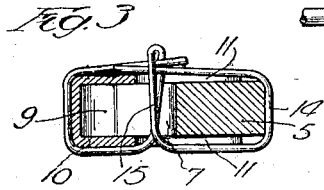
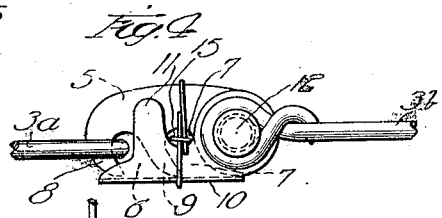
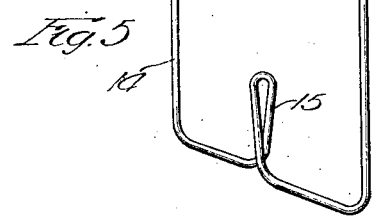
WITNESSES:
INVENTOR
John P. Mentzer
BY
ATTORNEY

UNITED STATES PATENT OFFICE.

JOHN P. MENTZER, OF CHICAGO, ILLINOIS.

LOCKING MEANS FOR CHAINS.

1,323,780.  Specification of Letters Patent.  Patented Dec. 2, 1919.

Application filed January 16, 1919. Serial No. 271,355.

*To all whom it may concern:*

Be it known that I, JOHN P. MENTZER, a citizen of the United States, residing at Chicago, in the county of Cook and State of Illinois, have invented a certain new and useful Improvement in Locking Means for Chains, of which the following is a full, clear, concise, and exact description, reference being had to the accompanying drawings, forming a part of this specification.

My invention relates to chains, and particularly to chains for automobile tires.

The principal object of the invention is to arrange for the locking of the ends of a chain together in such a manner that such ends may be separated when desired, but will not become separated accidentally.

A more special object of the invention is to arrange for the holding of an automobile tire chain detachably in position upon the wheel and to lock the same so that it will not be accidentally disconnected so as to come off the wheel, but at the same time to permit it to be readily undone and easily removed.

A further object of the invention is to construct this fastening or locking device so that it will be inexpensive and practical and may be readily applied and taken off.

In the accompanying drawings Figure 1 is a side elevation of the upper part of an automobile wheel and tire thereof, together with a chain having a locking or fastening device embodying my invention;

Fig. 2 is a plan view of a portion of the chain and said locking or fastening device;

Fig. 3 is a cross section taken on line 3—3 in Fig. 2;

Fig. 4 is a side elevation of the part of the chain shown in Fig. 2;

Fig. 5 is a perspective view of one of the elements of the device.

Referring to the drawings, I show spokes 1—1 of what may be understood to be an ordinary wheel of an automobile. On this is mounted a pneumatic tire 2. A chain is arranged on the tire, said chain having a side or rim chain 3 and a series of cross chains 4. The side or rim chain 3 is made with its ends detachably connected together by means of a suitable fastening or securing device permitting the connection of the ends 3$^a$ and 3$^b$ of the chain to hold the complete chain upon the tire, and also permitting said ends to be disconnected so as to allow the removal of the chain from the tire.

The device for connecting the ends 3$^a$ and 3$^b$ of the rim chain 3 is shown more fully in Figs. 2, 3 and 4. This consists of a body member 5 having two recesses 6 and 7 forming hooks or prongs 8 and 9. It also involves a sheath 10 adapted to fit over the lower or hooked portion of the member 5 and having a prong 11 fitting substantially over the hook 9. The member 5 and sheath 10 are held together by a pivot 12 which also permits the sheath 10 to swing with reference to the member 5 and so substantially cover and uncover the hooks 8 and 9. A link 3$^a$ of the chain 3 is shown engaging the hook 9 and the sheath 10 when in a closed position, as shown in Fig. 4, practically closes the space or recess 6 and thereby holds said link 3$^a$ in engagement with the hook 8. In this way the chain is detachably held in position, the ends being engaged by the connection or link arrangement 5 and being separated to permit the removal of the chain by swinging the sheath 10 down so as to release the chain link 3$^a$ and allow the latter to be disengaged from the hook 8, whereby the ends of the chain will be separated and the chain removed.

In actual practice there is the objection to this arrangement that the sheath 10 or locking member, as it may be called, may by the jarring of the vehicle wheel, become displaced so as to permit the link 3$^a$ to be disengaged from the hook 8. If this occurs the ends of the chain 3 become separated and the separated ends may do considerable damage by striking against parts of the automobile. It is even possible that the chain may become displaced from the tire and work entirely off from the wheel, dropping in the road with the consequent loss of an entire chain to the owner of the automobile. My invention prevents these undesirable results.

In accordance with the invention I provide means for holding the members 5 and 10 in closed or locking condition, in which the link 3$^a$ is held in engagement with the hook 8. The form of means shown comprises a wire strand 14 (Fig. 5) having a portion of its length, preferably its middle portion, bent to form a loop 15. This wire strand is applied to the chain connection by inserting the loop 15 through the end portion of the recess 7, as shown in Figs. 3 and 4. The end portions of the wire are then wrapped around the members 5 and 10 and passed through the loop 15, as best shown in Fig. 3. The wire strand thereby becomes a binding or locking device to hold the two parts of the chain connection together, and thereby prevent separation of the ends of the chain. If desired to remove the chain, the ends of the wire 14 are withdrawn from the loop 15 and then the loop 15 withdrawn from the recess 7 and the sheath 10 swung away from the member 5 so that the link 3ª can be disengaged from the hook 8. This permits the ends of the chain to be separated and by doing the same thing with the ends of the other side or rim chain on the other side of the wheel, the chain may be easily removed. When it is desired to again lock the chain in position either the same or another wire strand with loop 15 can be used and easily and quickly put into place. These wire binders may be made of wire which is not particularly stiff, but may be bent easily by the fingers so as to allow the ends to be readily bent and inserted through the end of the loop 15. Each automobilist would be provided with a number of these wire binding devices so that he could use them on his chain and if one became broken or if it was desired to remove and replace the chain, the binder for the same could be thrown away and a new one used.

Thus it will be seen that at a very insignificant expense and a very small amount of effort, an automobile chain may be locked safely in position and prevented from becoming undone and slipping off from the wheel.

It will be understood that changes and modifications may be made without departing from the spirit of the invention.

What I claim is:

1. The combination with a chain, of a connection for the ends of the same comprising a hooked member having a hook engaging one end of the chain and a locking member for temporarily locking the chain end in position on said hook, and means for holding said locking member in locking position, said locking means consisting of a binding member having a portion of its length passed through the connection and other portions of its length wrapped around the same and engaged with said passing through portion.

2. The combination with a chain, of a connection for the ends of the same comprising a hooked member having a hook engaging one end of the chain and a locking member for temporarily locking the chain end in position on said hook, and means for holding said locking member in locking position, said locking means consisting of a binding device having a portion of its length formed into a loop which projects through the connection, and another portion of its length wound around said connection and engaged with said loop.

3. The combination with a chain, of a connection for the ends of the same comprising a hooked member having a hook engaging one end of the chain and a locking member for temporarily locking the chain end in position on said hook, and means for holding said locking member in locking position, said binding means consisting of a wire strand having a portion of its length formed into a loop and projected through the connection and having other portions of its length on each side of said loop portion wrapped about said connection and inserted into the projecting end of said loop.

4. The combination of a chain, and a connection for the ends of the same, said connection comprising a member provided with a hook which is engaged by a link at one end of the chain, and a sheath adapted to fit over one side portion of said hooked member and to cover the end portion of said hook so as to retain said link in position thereon, and a binding device consisting of a wire strand having its middle portion bent to form a loop which is inserted through said connection, the portions of the wire strand on opposite sides of the loop being wrapped around the hooked member and sheath and their ends being passed through the projecting end portion of the loop.

5. The combination of a hooked member and a locking device for closing the hook, of means for holding the locking device in locking position, said means comprising a wire strand wrapped around said member and locking device and having its ends temporarily locked together.

6. The combination of a hooked member, a sheath for covering the hook of said member, and a wire strand wrapped around said member and sheath for holding same against separation, said wire strand having a portion of its length passed through said hooked member and sheath and another portion of its length wrapped around the same and engaged with said passing through portion.

7. The combination of a hooked member, a sheath for covering the hook of said member, and a wire strand wrapped around said member and sheath for holding same against separation, said strand having a loop projecting through said member and engaged with the ends of said strand.

In witness whereof I hereunto subscribe my name this 11th day of January, A. D., 1919.

JOHN P. MENTZER.